United States Patent [19]
Drazick

[11] 3,893,644
[45] July 8, 1975

[54] EJECTOR ACCELERATOR FOR MOLDING APPARATUS

[76] Inventor: Herman J. Drazick, 3558 Darcy, Birmingham, Mich. 48010

[22] Filed: Aug. 6, 1973

[21] Appl. No.: 386,188

[52] U.S. Cl. ........................... 249/68; 425/444
[51] Int. Cl. ................................. B28b 7/10
[58] Field of Search .......... 425/249, 422, 438, 350, 425/351, 444; 249/66–68; 74/110; 72/427

[56] References Cited
UNITED STATES PATENTS
3,137,905   6/1964   Steinman et al. .............. 425/438

*Primary Examiner*—Roy Lake
*Assistant Examiner*—Craig R. Feinberg
*Attorney, Agent, or Firm*—Robert M. Ashen, Esq.

[57] ABSTRACT

An injection molding apparatus is disclosed including an ejector accelerator mechanism, actuated by the movable portion of the mold, for providing differential or accelerated movements of certain of the mold ejector pins relative to other ejector pins.

The ejector accelerator may comprise a pair of parallel racks coupled by a pinion, one of the racks being adapted for contacting the ejector pin(s) whose motion is to be accelerated, the other rack being adapted for actuation by the movable portion of the mold during retraction thereof. The racks and pinions are arranged so that one rack is advanced in response and in proportion to the retraction of the other rack.

19 Claims, 8 Drawing Figures

EJECTOR ACCELERATOR FOR MOLDING APPARATUS

BACKGROUND OF THE INVENTION

This invention pertains generally to injection molding apparatus and more particularly to an improved ejector acceleration system for use in injection molding apparatus.

In the formation of articles by the injection molding process, plasticized material is forced under considerable pressure into a closed mold wherein the material cools and hardens. As the movable portion of the mold is retracted after hardening of the plastic material into a molded article, the molded article is typically ejected by means of a series of ejector pins. Rapid ejection of the molded article from the core is desirable to avoid undue adhering of the article to the core as a result of shrinkage. Many existing methods and apparatus for effecting such ejection involve at least some intervention by an operator who engages in manual manipulation of the molded article or of the molding machinery. Besides being inefficient such activity will be substantially limited when recently enacted Federal Safety legislation takes effect.

SUMMARY OF THE INVENTION

In accordance with the invention, apparatus is provided for imparting desired motion to ejector devices, typically ejector pins, relative to the movable portion of the mold in a plastic injection molding machine. Pursuant to the invention, such motion can take place over the entire travel of the movable mold portion during retraction or over only a part of said travel. Further, such motion may involve less than all of the ejector pins to secure differential rates of ejection for different portions of the article and/or to reduce the total contact area between the pins and the molded article.

According to a particular form of the invention, there is provided an ejector accelerator for accelerating the ejection of the molded article from the movable mold plates or other portion in an injection molding machine. The mold plate defines an ejector box and is movable between a molding or advanced position and a retracted position. An ejector plate means within the ejector box carries a plurality of ejector means, such as ejector pins, for engaging and ejecting the molded article during retraction of the mold plate. The ejector plate means carries ejector accelerator means responsive to the relative motion between the movable mold plate and the ejector plate means for accelerating the motion relative to the mold plate of at least one of the ejector means; such acceleration takes place during at least a portion of the travel of the mold plate from the molding position to the fully retracted position.

In accordance with one specific form of the invention, the ejector accelerator includes a pair of racks having toothed surfaces in opposed relationship and coupling means in the form of a pinion engaging both of the racks for transmitting motion therebetween. The racks are disposed so that when one is in the fully extended or advanced position, the other is in the fully retracted position, and vice versa. One of the racks is adapted for contacting an ejector pin and imparting acceleration thereto while the other rack is adapted to be engaged, during at least a portion of the travel of the mold plate by an actuator carried by the plate.

BRIEF DESCRIPTION OF THE DRAWINGS

Other ojects, advantages and features of the invention will be better understood from the detailed description below, in conjunction with the accompanying drawings, in which.

DETAILED DESCRIPTION OF THE INVENTION

Figure 2:
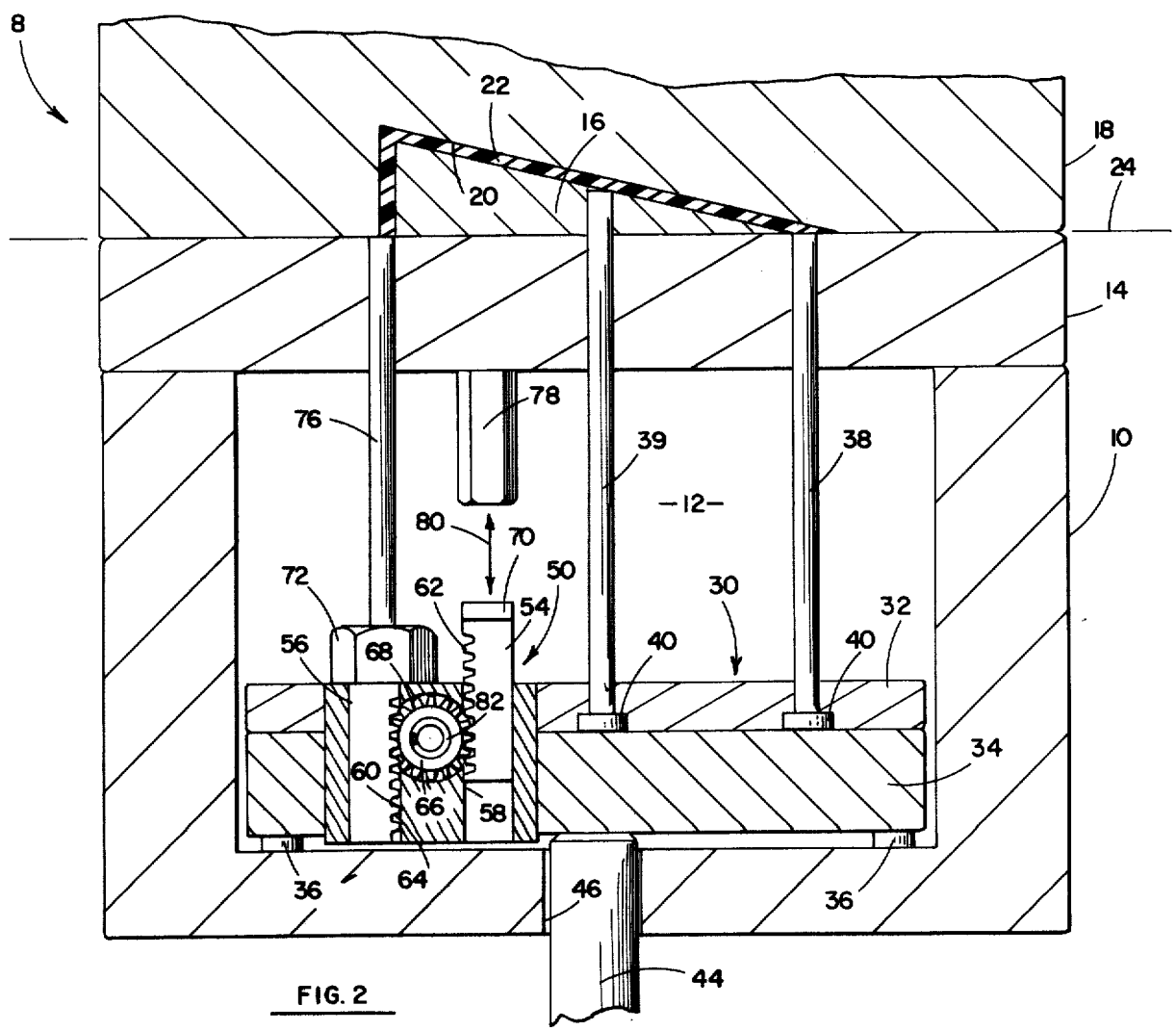
FIG. 2 is a somewhat simplified longitudinal cross-section view of a portion of an injection molding apparatus showing the ejector accelerator of FIG. 1 in place.

Referring to FIG. 2 of the drawings, there is shown therein, in somewhat simplified fashion, part of an injection molding apparatus 8. For sake of clarity, details such as assembly bolts, clamps, ejector plate guide pins, sprue, gates, and so forth, have been omitted.

The apparatus includes a movable mold plate 10 comprising the movable portion of the injection mold. The structure by which the movable mold plate is mounted on the injection molding apparatus is not shown, again for the sake of clarity. The movable mold plate 10 defines an ejector box 12 of substantially rectangular shape and carries a molding plate 14 from whose outer surface a pre-formed core element 16 projects. Mounted on the injection molding machine in opposed relationship to the movable mold plate 10 is a stationary cavity plate 18 having a mold cavity 20 which complements the core element 16 and in cooperation therewith defines a shaped space within which an article 22 is molded. The plate 18 extends to the parting line 24 between the mold halves.

Within the ejector box 12 is an ejector assembly 30 including an ejector pin support plate 32 secured to an ejector base plate 34. Attached to the underside or rear surface of the base plate 34, adjacent the four corners thereof, is a set of rest pads or stop buttons 36.

Projecting from the ejector pin support plate 32 is a pair of ejector pins 38, 39 comprising a first and second pin, respectively, having enlarged heads 40 disposed within rectangular grooves formed in the under or rear surface of the plate 32. The pin 38, in the molding or fully advanced position of the movable mold plate 10 (as shown in FIG. 2), terminates at the parting line 24 to make contact with an edge of the article 22 while the pin 39 projects past the parting line into the core 16 to make contact with the article 22 at a mid-point. It will be evident to those knowledgeable in the art that the number and positions of the ejector pins may be varied as required by the shape and size of the specific article being molded.

The injection molding apparatus includes a stationary shaft 44 which, upon retraction of the movable mold plate 10, projects through an opening 46 in the movable plate 10 to eventually engage the rear surface of the ejector base plate 34 to impart relative motion between the plate 10 and the ejector pins 38, 39 as will be more fully discussed below.

Figure 1:
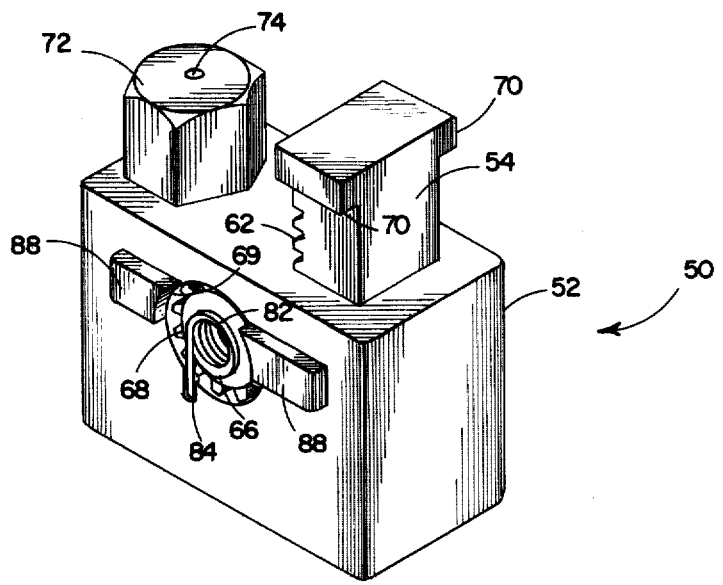
FIG. 1 is a perspective view of an ejector accelerator device in accordance with the present invention.

Turning now also to FIG. 1, the ejector assembly 30 carries an ejector accelerator 50 which forms an aspect of the present invention. As depicted, the accelerator 50 is affixed to plate 32. The accelerator 50 includes a housing 52 and coupled movable members comprising, in the depicted embodiment, a pair of parallel, reciprocable racks 54, 56 slideably received within longitudinal apertures 58 and 60, respectively, extending through the housing 52. It should be noted at this point, by way of definition, that the term "longitudinal" applies to the direction of motion of the movable mold plate 10; furthermore, elements are said to "advance" when the direction of movement is toward the stationary plate 18, upward, as shown in the drawings, and conversely, elements are said to "retract" when their direction of movement is away from the plate 18, downward, as shown in the drawings.

The racks, 54, 56 have toothed surfaces 62, 64 respectively disposed in opposed relationship and these surfaces engage a coupling member in the form of a pinion 66 carried in a sliding fit within a bore 68 extending through the housing 52 perpendicular to the apertures 58, 60. The pinion 66 is retained within the bore 68 in a manner well known in the art, namely, by means of a snap ring 69 adjacent each face of the pinion and projecting into appropriate grooves (not shown) in the wall of the bore 68.

The elements of the accelerator 50 are disposed in the housing 52 so that with one of the racks 54, 56 extending to its most advanced position from the housing 52, the other of said racks will be in its most fully retracted position.

The racks 54, 56 and apertures 58, 60 preferably have a rectangular or square cross-section to prevent rotation of the racks. It will be obvious that other cross-sectional shapes may be employed so long as the racks are suitably keyed to the housing to prevent their rotation.

The outer extremity of the rack 54 has outwardly projecting flanges 70 while the corresponding extremity of the rack 56 is provided with a hexagonal head 72 having a central, threaded hole 74 for receiving a third ejector pin 76. An ejector accelerator actuator rod 78, secured to the plate 14, projects toward the flanged end of the rack 54 and is disposed in alignment therewith. A gap 80 separates the face of the actuator rod 78 and the outer extremity of the rack 54 prior to retraction of the mold plate 10.

A wound return spring 82 having one end extending into a slot 84 in the housing 52, being restrained thereby, and having its other end attached to the pinion 66, biases the pinion 66 counterclockwise (as viewed in FIGS. 1 and 2) to a limiting position in which rack 54 is in its most advanced position and rack 56 is in its most retracted position, the movement in said counterclockwise direction being limited by virtue of the hex head 72 engaging the upper surface of the housing 52. It will be evident that retraction of rack 54 will cause rack 56 to advance in proportion to the displacement of rack 54.

The ejector accelerator 50 is held in place by mounting flanges 88 received within grooves or slots (not shown) formed in the ejector base plate 34.

Figure 3C:
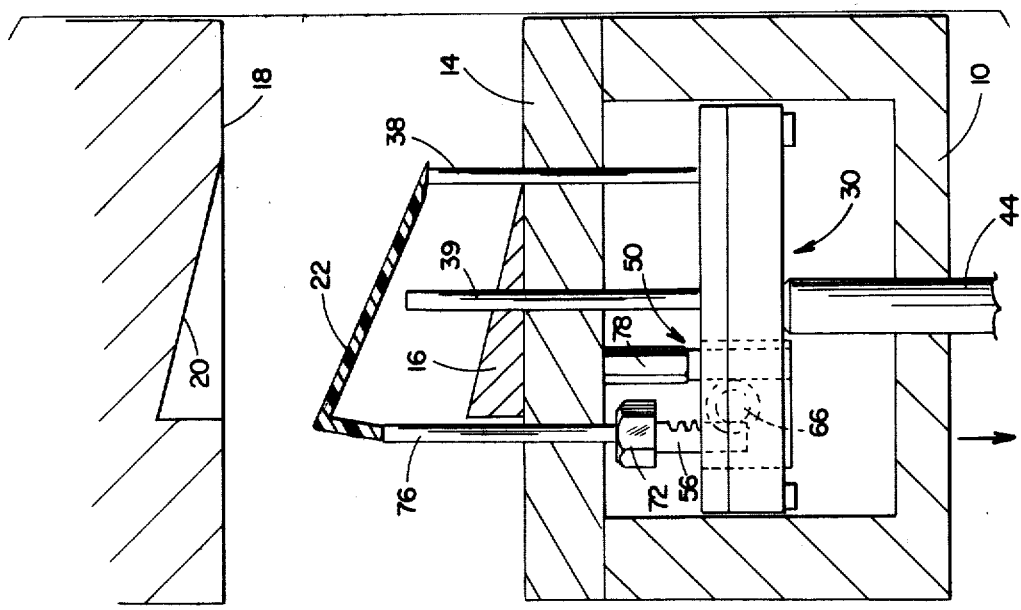
FIGS. 3A–3C are somewhat simplified longitudinal cross-sectional views, similar to that of FIG. 2, showing the sequence of operation of the apparatus.
Figure 3B:
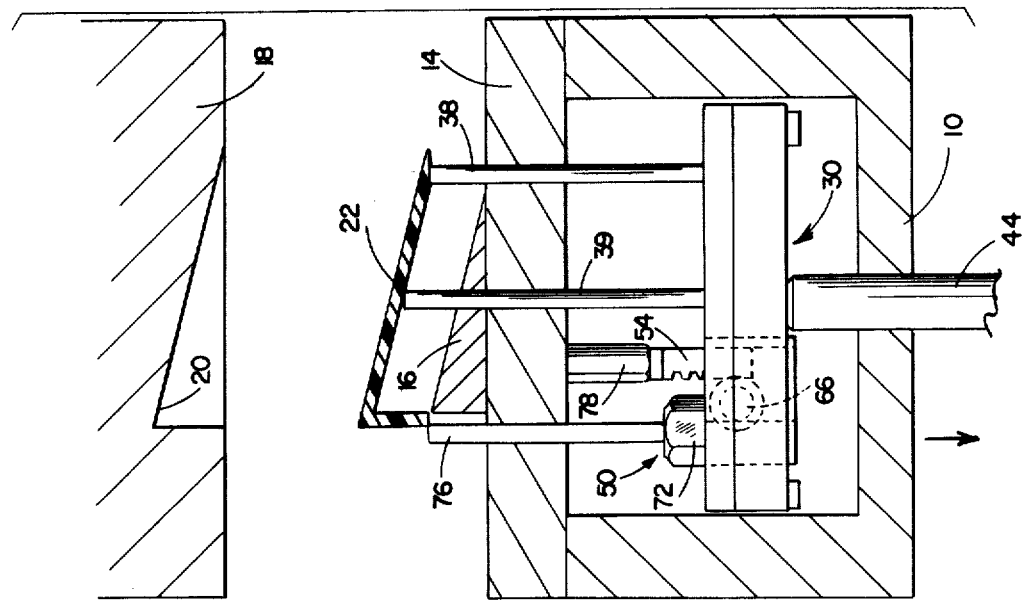
Figure 3A:
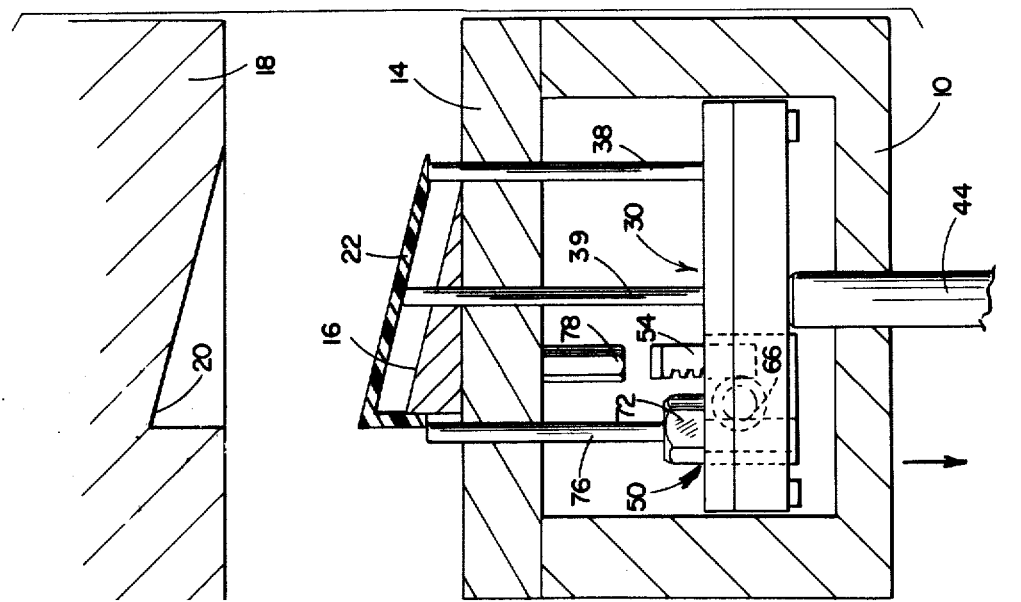

Turning now to FIGS. 3A–3C there is shown in sequence the manner of operation of the embodiment of the invention depicted in FIG. 2. Following injection of the plasticized material into the mold and cooling and hardening of the material, retraction of the movable mold plate 10 is begun. Initially, (FIG. 3A), the plate 10 and ejector assembly 30 retract as a unit to withdraw the article from the stationary cavity plate 18 and to assure that the stationary mold portion of the apparatus 8 is cleared. In retracting, the movable mold plate 10 moves at a certain velocity with respect to the stationary element of the mold apparatus; this velocity is defined as the retractive velocity. At a predetermined point in the retraction path, the stationary shaft 44 makes contact with the ejector base plate 34. The contact between the shaft 44 and the plate 34 halts the movement of the ejector assembly 30 while the motion of movable mold plate 10 is unaffected; further retraction of the mold plate 10 increasingly displaces the ejector pins 38, 39 upwardly relatively to the base 10. This increasing relative displacement results in increasing projection of the pins 38, 39, 76 above the top of the plate 10 thus tending to thrust the molded article 22 off the core 16. It will be noted that during this portion of the cycle the velocity of the plate 10 is the same relative to all of the ejector pins 38, 39, 76.

Still further retraction of the movable mold plate 10 closes the gap 80 until the actuator rod 78 contacts the flanged end of rack 54 (FIG. 3B). Continued movement (FIG. 3C) of the mold plate 10 thrusts rack 54 against rod 78 thus producing retractive or downward motion of rack 54 relative to the ejector assembly 30. This motion of rack 54 causes rack 56 and ejector pin 76 connected thereto to be advanced relative to the ejector pins 38, 39 at a velocity equal in magnitude to, but in a direction opposite to, the velocity of the mold base relative to the ejector assembly which latter velocity is equal to the retractive velocity of the mold plate 10. This action may also be viewed as adding to the upward velocity of the pin 76 a component of velocity relative to the ejector 50 equal to the velocity of the ejector relative to the mold plate 10. Thus, the velocity of ejector 76 relative to the mold plate 10 is accelerated to twice its own previous velocity and to twice the velocity of pins 38, 39. The end of the molded part contacting pin 76 is thus lifted at twice its previous rate and at twice the velocity of pins 38, 39. Consequently, the article pivots away from central pin 39, resulting in rapid and positive disengagement of the article from the pins and ejection of the article 22 from the mold plate 10.

In the embodiment described above there are distinct stages involved in the ejection of the molded article; these stages may be controlled as to timing and duration, as well as to the displacement effected, in accordance with the design of a given injection molding apparatus. Thus, the start of ejector pin movement relative to the movable mold plate 10 is determined by the size of the initial gap separating the stationary shaft 44 from the ejector base plate 32. Further, the onset of accelerated movement of the ejector pin 76 and the duration of said accelerated movement is determined by the initial length of the gap 80. If, for example, this gap were nonexistent at the outset of retractive motion, accelerated movement would take place throughout the retraction of the movable mold plate following engagement of the base plate 34 by the stationary shaft 44. It should also be noted that, in accordance with the invention, all ejector pins may be subjected to the action of the ejector accelerator 50, thus resulting in non-rotational motion of the molded article at a higher velocity than would be achieved in the absence of the ejector accelerator. Further, it should be noted that accelerated motion of other magnitude than twice that of the velocity of the movable mold plate relative to the ejector plate may be effected in accordance with the invention. For this purpose, the coupling element of the ejector accelerator, which transmits motion between the pair of coupled movable members, would be arranged accordingly. For example, the coupling member may comprise gear means, hydraulic means or cam means, providing a velocity ratio other than 1:1 between the movable members. As a further example, in a particular embodiment of the invention, each of a pair of gears comprises a pinion engaging a rack such as the racks described above, with the gears having a gear ratio providing the desired velocity ratio.

Figure 4:
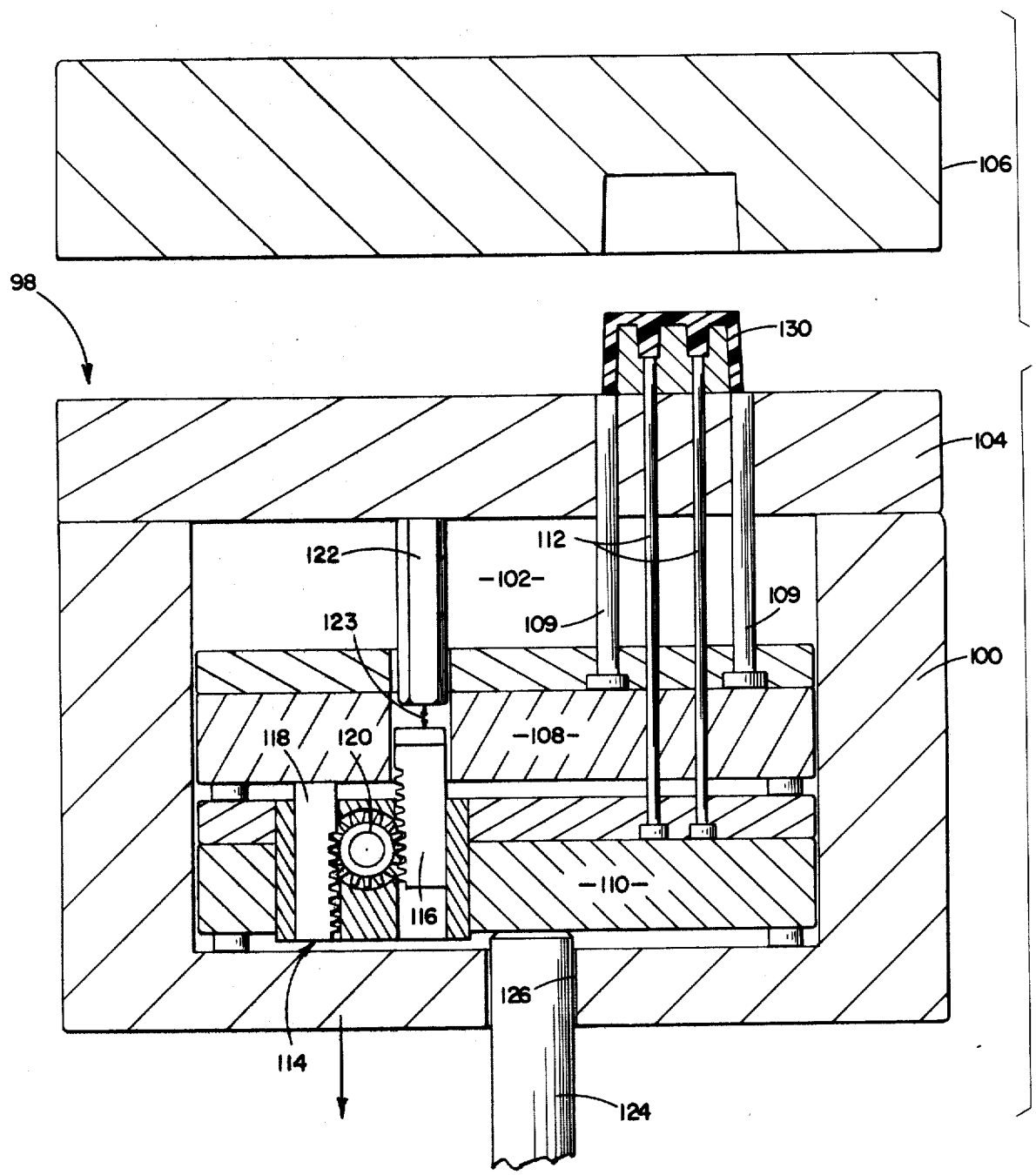
FIG. 4 is a somewhat simplified, longitudinal cross-section of a portion of an injection molding apparatus in accordance with an alternative embodiment of the invention utilizing dual ejector plate assemblies.

The ejector accelerator of the invention is compact and lends itself particularly to installation within the ejector plates of existing injection molding machines. Positive return of racks 54, 56 to their initial positions is assured by the return spring. Operation of the accelerator involves simple motion of inexpensive basic machine elements that can be easily heat-treated for exceedingly long life. Moreover, a wide range of ejector pin sizes can be accommodated by the accelerator, and ejector pins of various lengths and diameters may be interchanged. Referring now to FIG. 4, there is shown, in a partially retracted position, an alternative embodiment of the present invention by which substantially rotation-free accelerated ejection of a molded article from a movable mold plate may be achieved where desired. A molding apparatus 98 includes a movable mold plate 100 defining an ejector box 102 and carrying a core-defining plate 104 in opposed relationship with a stationary, cavity-defining plate 106.

The ejector box 102 houses initially contacting dual ejector assemblies including a forward ejector assembly 108 carrying ejector pins 109 and a rear ejector assembly 110 carrying ejector pins 112. Mounted within the rear ejector assembly 110 is an ejector accelerator 114 similar to the mechanism 50 described in connection with the first embodiment. Ejector accelerator 114 includes a first movable member comprising a first rack 116, a second movable member comprising a second rack 118, and a coupling member in the form of a pinion 120. The accelerator 114 is spring-biased to the position shown in FIG. 4 in which the rack 116 is fully extended and the rack 118 is fully retracted. The same definitions of terms relating to motion of elements of apparatus 98 apply as applied in the description relating to FIGS. 1-3C. An actuator rod 122 is secured to the plate 104 and is adapted to engage the forward extremity of the rack 116. A gap 123 initially separates the rod 122 from the rack 116. The face of the rack 118 is in contact with the rear surface of the forward ejector assembly 108.

A stationary shaft 124, mounted on the frame of the injection molding apparatus 98, projects through a hole 126 in the rear wall of the movable mold plate 100 into the ejector box 102 to engage the rear surface of the rear ejector assembly 110 upon retraction of the movable mold plate 100.

Figure 5B:
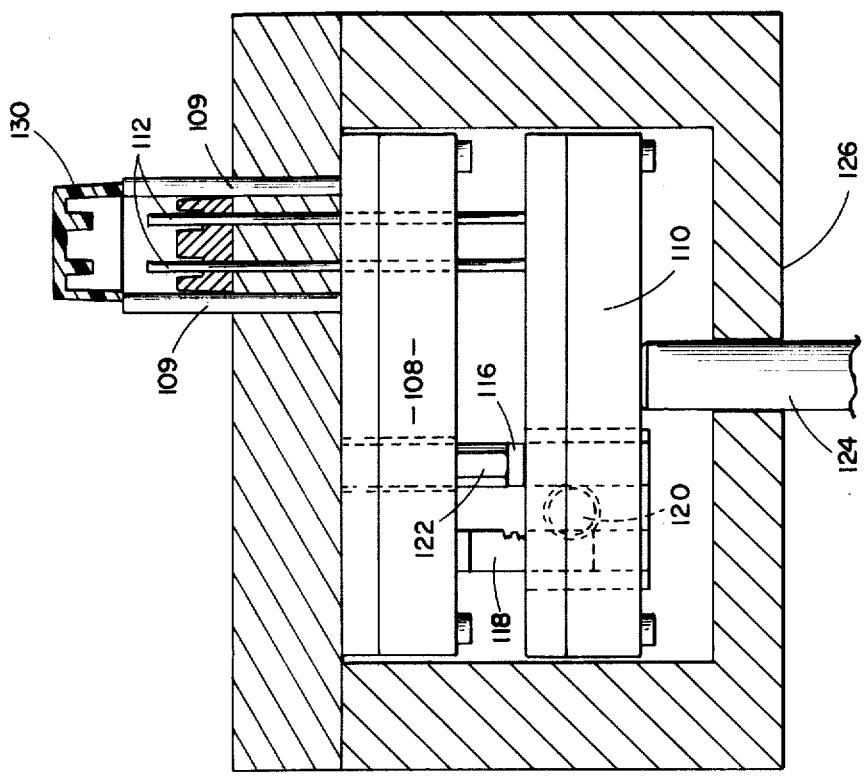
FIGS. 5A–5B are longitudinal cross-section views of the machine of FIG. 4 showing the sequence of operation of the apparatus of FIG. 4.
Figure 5A:
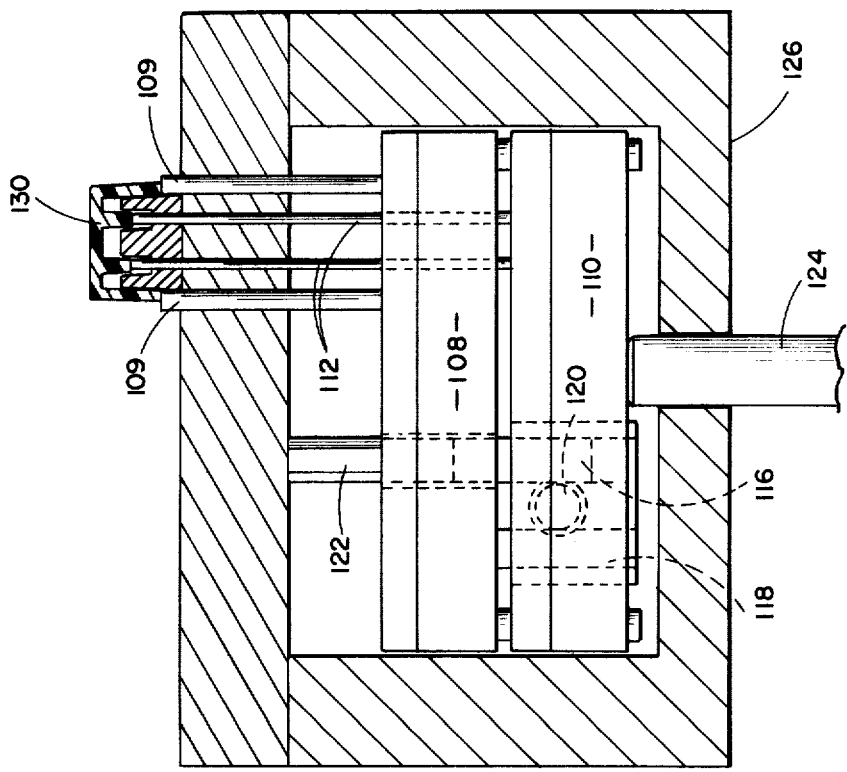

Turning now also to FIGS. 5A and 5B, in operation following the injection and cooling cycles, movable mold plate 100 is retracted. Until the stationary shaft 124 contacts the rear ejector assembly 110, the mold plate 100 and ejector assemblies 108, 110 move together rearwardly to withdraw a molded article 130 from the stationary cavity plate 106. After contact is made by the shaft 124 (FIG. 4), ejector assemblies 108, 110 are held stationary, while plate 100 continues in motion, and thus assume an upward velocity relative to the retracting mold plate 100, thereby tending to urge article 130 off plate 100 (FIG. 5A).

After an interval determined by the initial length of the gap 123 and the velocity of retraction of the mold plate 100, the rod 122 engages rack 116. Further retraction of mold plate 100 now causes the forward ejector assembly 108 to advance relative to the rear ejector assembly 110 at a velocity equal in magnitude, but opposite in direction to, the velocity of retracting mold plate 100, in response to the advancement of the rack 118. As a result, ejector pins 109 advance relative to pins 112 thereby lifting the article 130 off pins 112 (FIG. 5B) to facilitate release and ejection of the article.

The specific embodiments of the invention described and depicted hereinabove, do not define the invention, which is defined by the following claims.

What is claimed is:

1. Injection molding apparatus comprising:

a movable mold plate including a core upon which molded articles are formed and deposited, the movable mold plate being movable between a molding position and a retracted position, the movable mold plate further including an ejector box and ejector means disposed within the ejector box, the ejector means being movable relative to the mold plate to impinge upon the core during motion of the mold plate from the molding position to the retracted position, for ejecting molded articles disposed on the core, and an actuating member on said movable mold plate; and ejector accelerator means for varying the relative velocity of the ejector means during at least a portion of the motion of the movable mold plate to the retracted position, the ejector accelerator means including a housing with means forming first and second elongated slots in said housing, a first non-rotatable and longitudinally movable element in said first slot for engaging the actuating member on said movable mold plate during retractive motion thereof thereby urging the first movable element away from the core, a second non-rotatable and longitudinally movable element in said second slot movable toward the core when the first movable element moves away from said core and engaging the ejector means, a coupling element coupling the first movable element to the second movable element so that the latter element moves in response to motion of the former element, and spring return means operatively connected to said coupling means for biasing said first movable element toward the core and the second movable element away from the core when the first movable element is no longer in engagement with the actuating member, said first and second movable elements moving toward and away from the core through movement of said mold plate and engagement of said first movable element with said actuating member during said retractive motion and through the action of said spring return means without any external drive means so that the first and second movable elements move primarily in response to movement of said mold plate and through action of said spring return means.

2. The injection molding apparatus as set out in claim 1 wherein the movable mold plate moves to the retracted position at a first velocity and wherein the first element of the ejector accelerator means is adapted to engage the movable mold plate to move at the first velocity relative to the movable mold plate and wherein the second element of the ejector accelerator means is adapted to have a component of motion opposite to that of the first element, in response to motion of the latter element.

3. An ejector accelerator for accelerating the movement of ejector means in injection molding apparatus, said apparatus comprising:
  a. a housing,
  b. an ejector means operatively associated with said housing,
  c. means forming first and second spaced apart parallel elongated slots in said housing,
  d. a first element movably disposed within the first slot in said housing for reciprocation relative to and within said housing between a fully extended position and a fully retracted position,
  e. a second element movably disposed within the second slot in said housing for reciprocation relative to and within said housing between a fully extended position and a fully retracted position to impart motion to said ejector means,
  f. said first and second slots being sized and shaped relative to said respective first and second movable elements to restrain said first and second movable elements against any rotatable movement and only permitting longitudinal shifting movement in the respective first and second slots,
  g. said first and second elements having spaced apart toothed surfaces in opposed relationship,
  h. gear means interposed between said toothed surfaces in meshing engagement therewith for transmitting motion between said elements,
  i. said gear means being interposed in such position such that said first element is fully retracted when said second element is fully extended and said first element is fully extended when said second element is fully retracted,
  j. the motion of said second element being inversely proportional to the motion of said first element,
  k. said first element being movable to its fully retracted position only through relative movement between said housing and a mold forming part of said molding apparatus when contact exists therebetween and without any external drive means forming part of said ejector accelerator and
  l. a wound spring having a first end secured to said housing and a second end secured to said gear means, said spring biasing said gear means to urge said second element to its fully retracted position against the action of a mold urging opposite movement so that said spring biases said first element to its fully extended position,
  m. said first element being returned to its extended position only through the action of said spring.

4. The ejector accelerator of claim 3 further characterized in that said first and second elements are racks having such toothed surfaces.

5. The ejector accelerator of claim 3 further characterized in that said gear means is a pinion gear.

6. The ejector accelerator of claim 5 further characterized in that said housing is provided with a recess, and that said pinion gear is disposed within said recess.

7. The ejector accelerator of claim 3 further characterized in that said wound spring has its first end secured to a slit within said housing and being restrained thereby.

8. The ejector accelerator of claim 3 further characterized in that one of said elements is provided on one of its ends with an enlarged outwardly projecting flange and the other of said elements is provided on a corresponding one of its ends with a bolt-type head.

9. An injection molding apparatus comprising:
  a. a movable mold plate movable between an advanced position and a retracted position,
  b. means forming a recess in said mold plate and defining an ejector box,
  c. an ejector plate disposed within said ejector box and being movable relative to said ejector box,
  d. an ejector housing disposed within said ejector box and said housing having an outer ejector casing,
  e. means forming first and second opposed parallel elongated slots within said ejector housing,
  f. a first reciprocative element located within said first elongated slot retractable in response to retraction of said movable mold plate relative to said ejector plate from an extended position to a retracted position,
  g. a second reciprocative element located within said second elongated slot also movable from an extended position to a retracted position,
  h. coupling means for coupling the first and second reciprocative elements so that said second element is advanced when said first element is retracted and said first element is advanced when said second element is retracted,
  i. said first and second slots being sized and shaped relative to said first and second movable elements to restrain said first and second movable elements against any rotatable movement and only permitting longitudinal shifting movement in the respective first and second slots,
  j. ejector means carried by said ejector plate and being adapted to engage a molded article disposed in relation to said mold plate,
  k. actuating means in said ejector housing located to engage said first reciprocative element as said mold plate is shifted and urge said first reciprocative element to its retracted position and simultaneously urge said second reciprocative element to its extended position,
  l. said first element being movable to its fully retracted position only through relative movement between said first reciprocative element and said actuating means of said molding apparatus when contact exists therebetween and without any external drive means forming part of said ejector plate,
  m. and biasing means operatively associated with said coupling means for biasing said first reciprocative element to its extended position upon disengagement of said actuating means and first reciprocative element.

10. The injection molding apparatus of claim 9 further characterized in that said biasing means is a coiled spring section.

11. The injection molding apparatus of claim 9 further characterized in that said ejector means comprises first and second ejector elements carried by said ejector plate and adapted to engage a molded article disposed on said movable mold plate and to eject said article from said movable mold plate during motion of said movable mold plate toward said retracted position and relative to said ejector plate, said first and second reciprocative elements and said coupling means being operative and responsive to the motion of said movable mold plate relative to said ejector plate and said ejector housing for accelerating the motion of said second ejector element relative to said movable mold plate during at least a portion of the travel of said movable mold plate from said advanced position to said retracted position.

12. The injection molding apparatus of claim 9 further characterized in that first and second reciprocative elements comprise spaced apart and parallel first and second racks having toothed surfaces in opposed relationship and said coupling means comprises a pinion gear engaging said toothed surfaces.

13. The injection molding apparatus of claim 12 further characterized in that spring means is operatively associated with said first and second racks for biasing said first and second racks to respective fully advanced and fully retracted positions without external drive means forming part of said ejector housing.

14. The injection molding apparatus of claim 9 further characterized in that said actuating means and said first reciprocative element are separated by a gap of predetermined length in the fully advanced position of said movable mold plate whereby accelerated movement of said at least one ejector element takes place only during a terminal portion of the travel of said movable mold plate toward said retracted position.

15. The injection molding apparatus of claim 9 further characterized in that said ejector plate comprises two individual ejector plates, each of said ejector plates carrying ejector means, and each of said reciprocative elements having heads which are adapted to engage only one of said two ejector plates for accelerating the movement of the ejector means carried by said one ejector plate.

16. In an injection molding apparatus, including a movable mold plate having a mold core upon which molded articles are formed, and having ejector means for ejecting molded articles from the mold core, an ejector accelerator comprising:
  a. a housing positionable in operative relation with the mold plate,
  b. means forming first and second spaced apart parallel elongated slots in said housing,
  c. a first movable element disposed within said first slot in the housing and being movable in a forward and rearward direction relative to the housing,
  d. said first movable element being disposed in operative relation with the mold plate when the housing is positioned in operative relation with the mold plate,
  e. a second movable element disposed within said second slot in the housing and second movable element being movable in a forward and rearward direction relative to the housing and being disposed in operative relation with the ejector means,
  f. said first and second movable slots being sized and shaped relative to said respective first and second movable elements to restrain said first and second movable elements against any rotatable movement and only permitting longitudinal shifting movement in the respective first and second slots,
  g. said first movable element being located to be actuated by an actuating means associated with the mold core and being urged in a rearward direction upon contact therewith when said mold plate moves a predetermined distance after forming a molded article,
  h. coupling means operatively associated with the first movable element and the second movable element for coupling the first and second movable elements, such that motion of the first movable element is in the opposite direction to motion of the second movable element,
  i. and spring means operatively associated with said coupling means to bias the first movable element forwardly and the second movable element rearwardly without any form of external drive means therefor.

17. The ejector accelerator of claim 16 further characterized in that the first movable element comprises a first rack means and the second movable element comprises second rack means, the coupling means comprising pinion gear means coupled with the rack means.

18. The ejector accelerator of claim 16 further characterized in that the ratio of motion of the first movable element and the second movable element is substantially equal to one-to-one.

19. The ejector accelerator of claim 16 further characterized in that the coupling means comprises a pinion gear and cooperating gear means with other than a one-to-one ratio therebetween such that the ratio of motion of the first movable element and the second movable element is other than one-to-one.

* * * * *